(12) United States Patent
Schuettenberg

(10) Patent No.: US 8,123,244 B2
(45) Date of Patent: *Feb. 28, 2012

(54) LOW PROFILE SADDLE MOUNT

(75) Inventor: Donald W. Schuettenberg, Antioch, IL (US)

(73) Assignee: ATC Leasing Company LLC, Pleasant Prairie, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/801,671

(22) Filed: Jun. 21, 2010

(65) Prior Publication Data

US 2010/0259030 A1    Oct. 14, 2010

Related U.S. Application Data

(63) Continuation of application No. 11/567,295, filed on Dec. 6, 2006, now Pat. No. 7,744,112.

(60) Provisional application No. 60/761,720, filed on Jan. 24, 2006.

(51) Int. Cl.
    *B60P 3/06*    (2006.01)

(52) U.S. Cl. ........................................ 280/503; 280/402

(58) Field of Classification Search .................. 280/402, 280/503, 506; 414/563
    See application file for complete search history.

(56) References Cited

U.S. PATENT DOCUMENTS

| | | |
|---|---|---|
| 3,510,016 A | 5/1970 | Wolff et al. |
| 3,630,321 A | 12/1971 | Hollnagel |
| 3,864,051 A | 2/1975 | Reid |
| 4,398,743 A | 8/1983 | Belsky et al. |
| 4,493,491 A | 1/1985 | Karlik |
| 4,555,214 A | 11/1985 | Morton |
| 4,737,066 A | 4/1988 | Allison, Jr. |
| 4,762,192 A | 8/1988 | Maxwell |
| 4,800,702 A | 1/1989 | Wheeler |
| 4,822,089 A | 4/1989 | Moore et al. |
| 4,867,468 A | 9/1989 | Paul et al. |
| 4,949,985 A | 8/1990 | Lichter |
| 4,974,125 A | 11/1990 | McGehee |
| 5,143,393 A | 9/1992 | Meyer |
| 5,326,123 A | 7/1994 | Guest et al. |
| 5,391,044 A | 2/1995 | Young |
| 5,465,813 A | 11/1995 | Lichter |
| 5,703,411 A | 12/1997 | Bella et al. |
| 5,722,677 A | 3/1998 | Lichter et al. |
| 5,769,460 A | 6/1998 | Imai |
| 5,873,593 A | 2/1999 | Gesuale |
| 6,109,642 A | 8/2000 | Schuettenberg |
| 6,120,051 A | 9/2000 | Lichter et al. |
| 6,209,297 B1 | 4/2001 | Yeomans et al. |
| 6,382,656 B1 | 5/2002 | Johnson, Jr. |
| 6,485,045 B1 | 11/2002 | King |
| 6,491,490 B1 | 12/2002 | Trobee et al. |
| 6,957,856 B2 | 10/2005 | Chiang et al. |
| 7,017,934 B2 | 3/2006 | Harris |
| 2006/0115324 A1 | 6/2006 | Zenda et al. |

OTHER PUBLICATIONS

U.S. Appl. No. 09/650,207, filed Aug. 29, 2004, Schuettenberg.
U.S. Appl. No. 10/463,397, filed Mar. 18, 2004, Troha et al.

*Primary Examiner* — Tony Winner
(74) *Attorney, Agent, or Firm* — Vorys, Sater, Seymour & Pease LLP

(57) ABSTRACT

A low profile saddle mount for use in the transportation of vehicles including a saddle body configuration capable of withstanding increased load capacity over conventional saddle mounts is disclosed. The saddle mount generally includes a pair of laterally spaced support plates and a substantially tubular cross member extending therebetween. Each of the support plates is at least partially disposed inside the cross member at opposing ends thereof and secured therein using at least one dampening or filler plate. The configuration of the support plates in combination with one or more filler plate provides limited yield/deflection of the saddle body during operation and provides a load dissipation function, thereby permitting the support plates to withstand an increased load capacity.

17 Claims, 5 Drawing Sheets

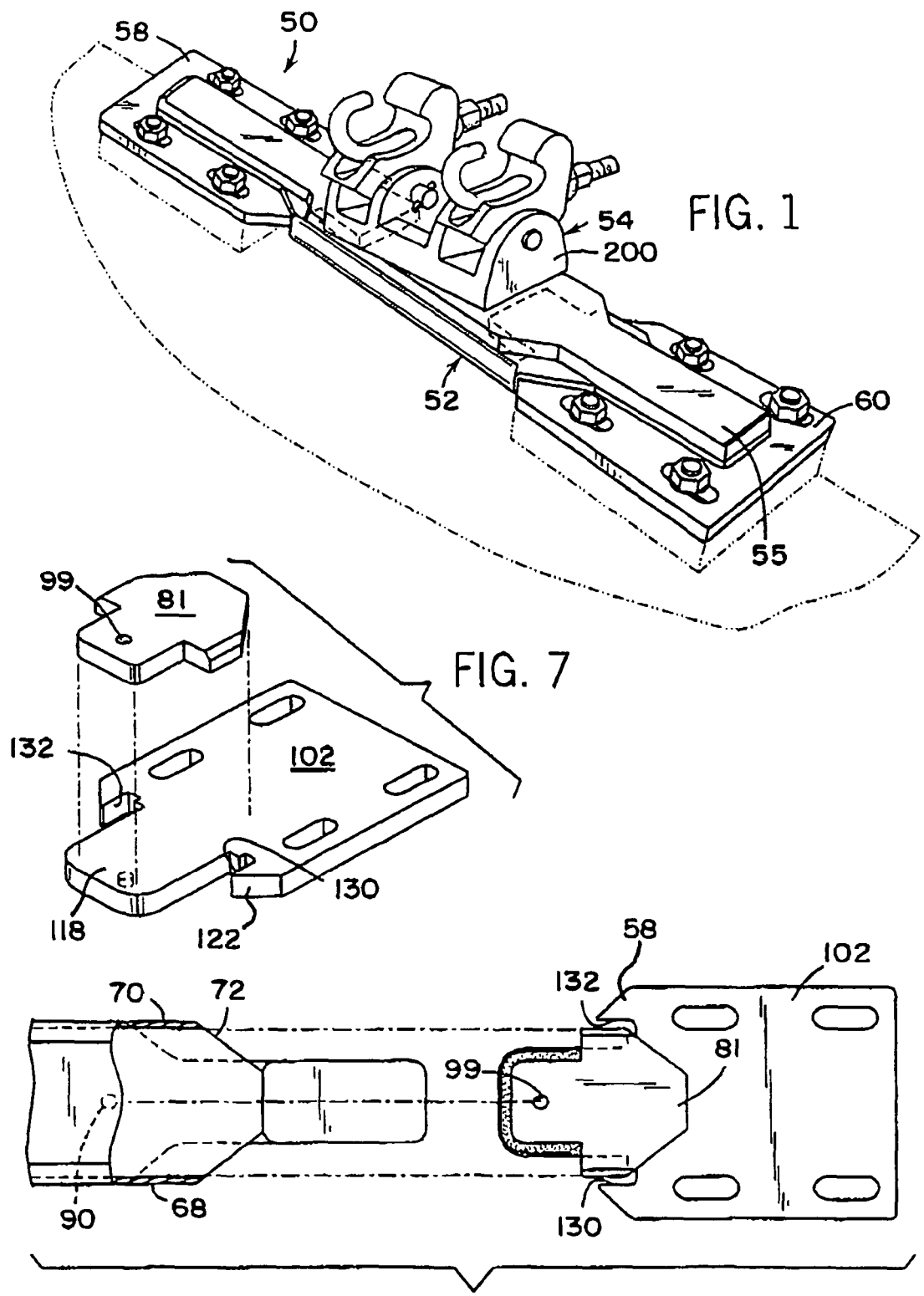

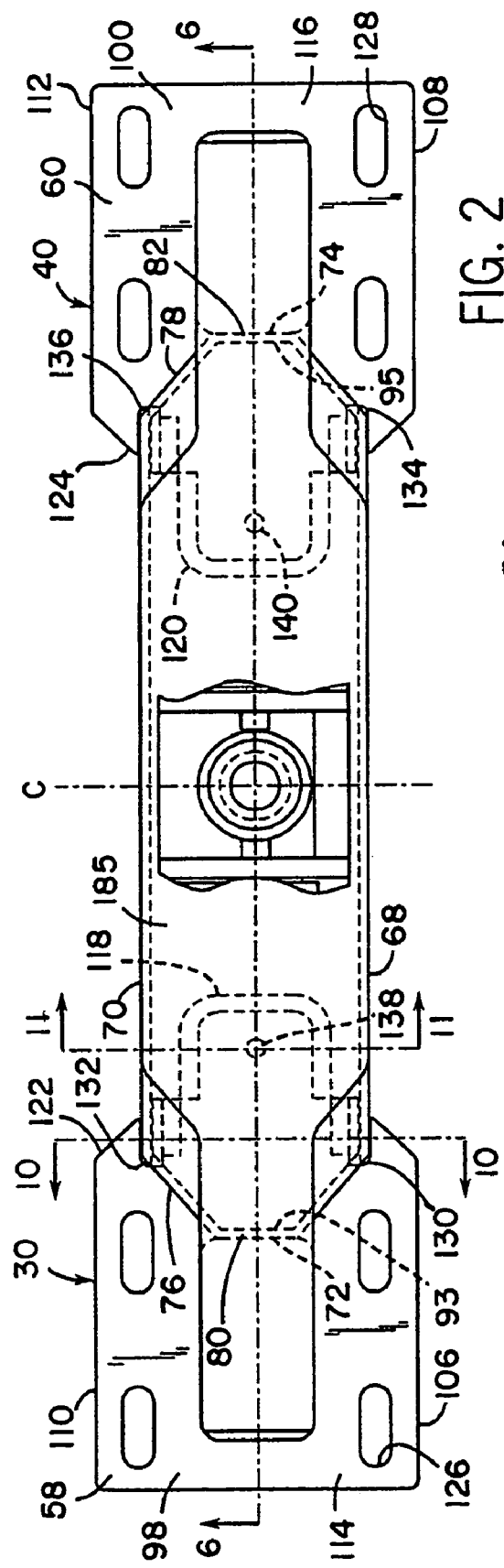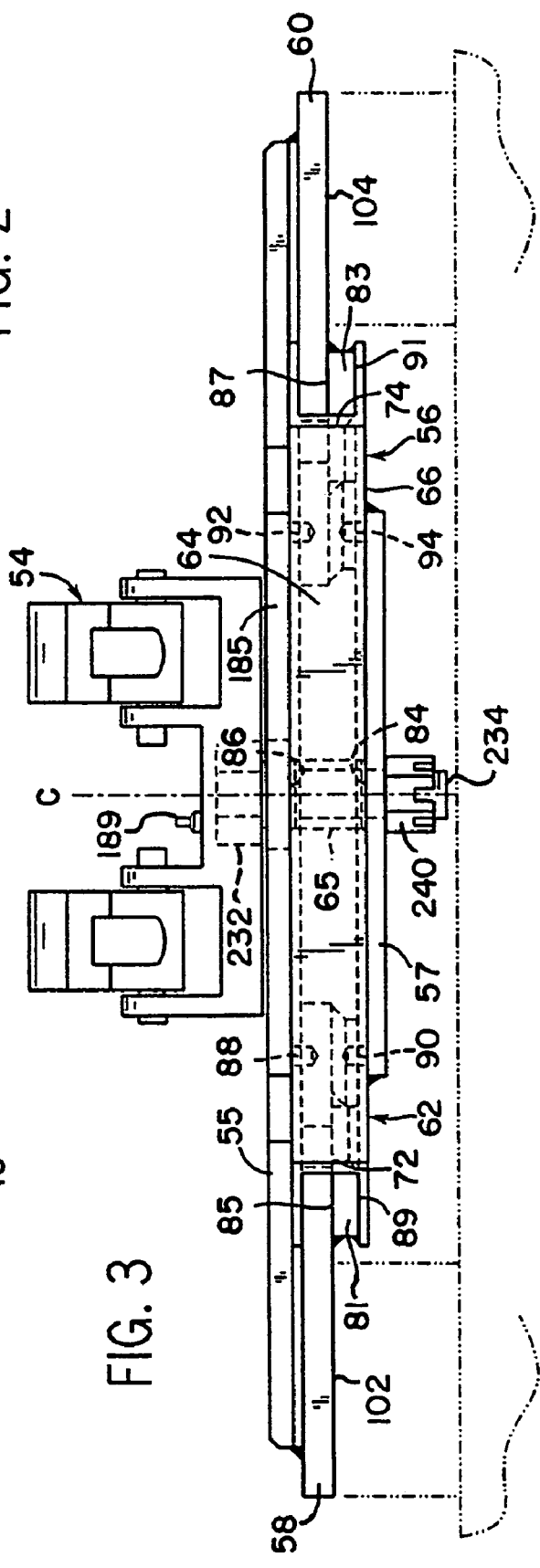

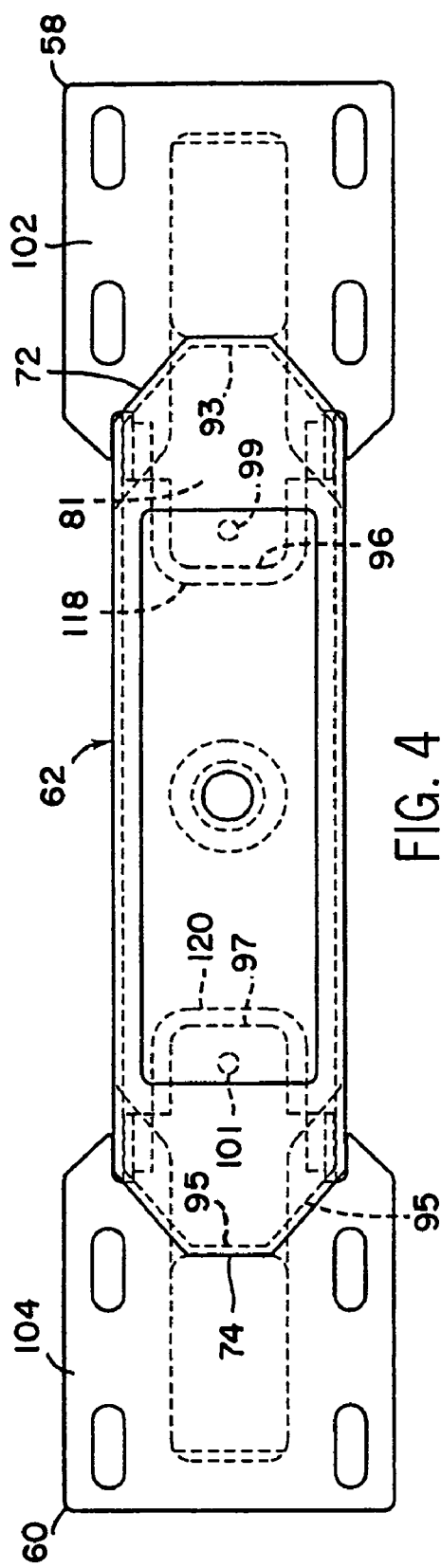
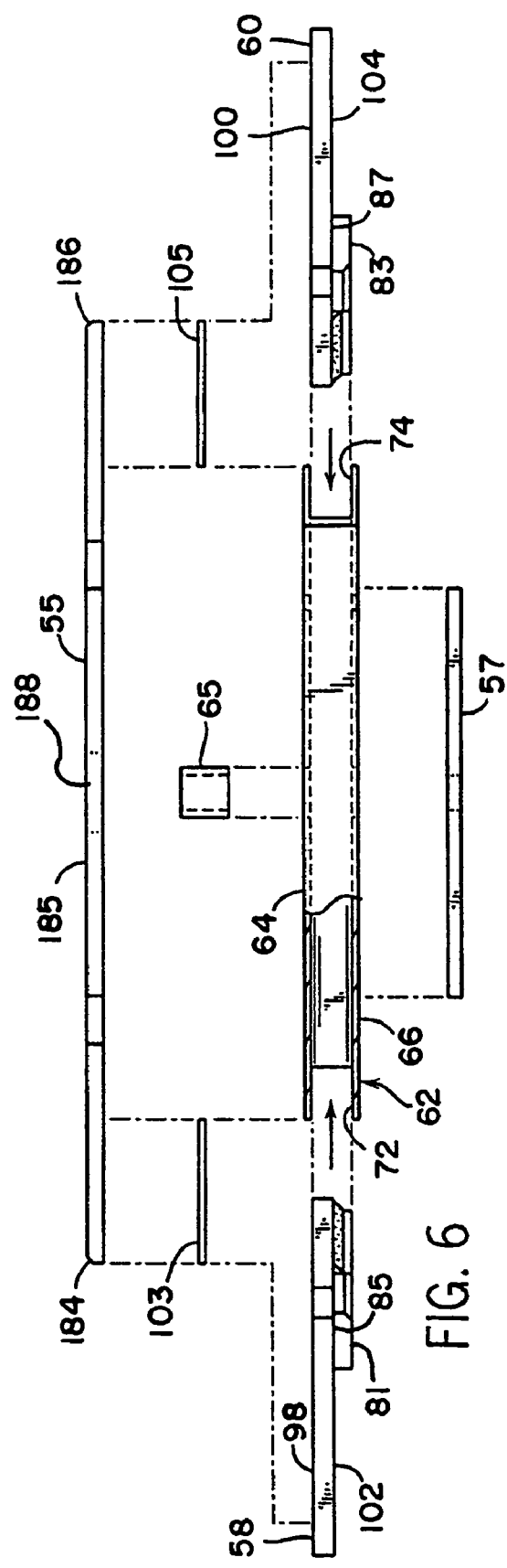
FIG. 4
FIG. 6

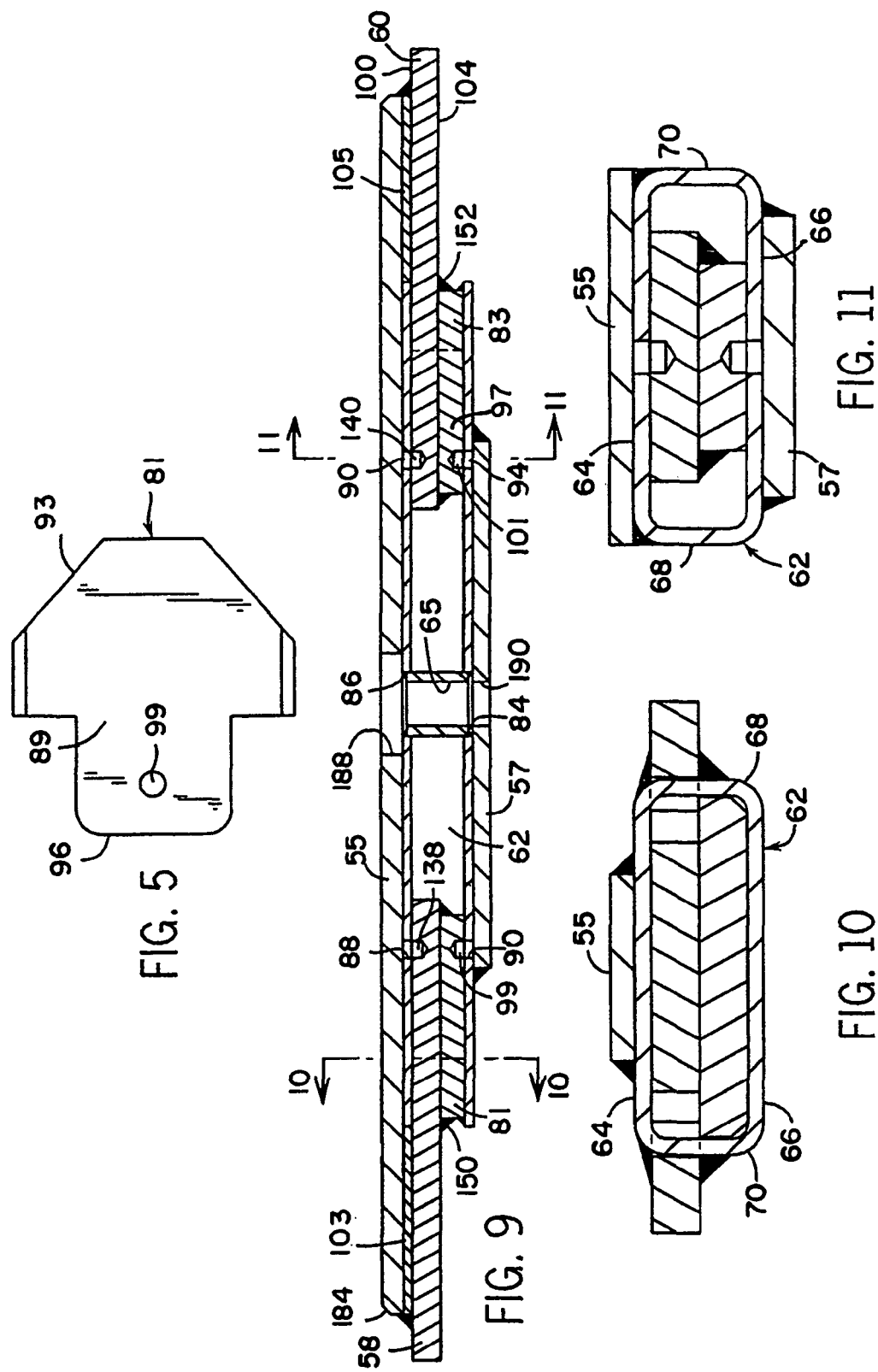

LOW PROFILE SADDLE MOUNT

This application is a continuation application, which claims the benefit, under 35 U.S.C. §120, of prior U.S. application Ser. No. 11/567,295 filed Dec. 6, 2006, now U.S. Pat. No. 7,744,112, which claims the benefit of the filing date under 35 U.S.C. §110(e) of Provisional Application No. 60/761,720, filed Jan. 24, 2006, which is hereby incorporated by reference in its entirety.

FIELD OF THE INVENTION

The present invention relates generally to an apparatus for coupling wheeled vehicles together to permit one vehicle to tow another, and more particularly to an improved underslung saddle mount configuration for coupling a leading vehicle to a towed vehicle.

BACKGROUND OF THE INVENTION

Devices for coupling vehicles together to transport newly manufactured or used vehicles between multiple locations are well known. Conventionally, a saddle, designed to couple a lead vehicle to a towed vehicle or combination of vehicles, is coupled to the lead vehicle. In truck applications, the saddle is conventionally mounted to either the fifth wheel, or to the frame of the lead truck. The saddle is then generally coupled to the front axle of the towed vehicle, such that the front axle of the towed vehicle is lifted from the ground, and the towed truck rolls on the rear wheels only. Alternatively, multiple saddles can be attached to additional trucks individually to allow for the transport of a maximum of four trucks in total.

Conventional saddle mount configurations generally include a saddle body used to secure the saddle mount to the frame of the towing vehicle and a saddle head for securing and retaining the front axle.

The saddle body of a conventional underslung saddle mount includes a middle section or cross member and opposing horizontal end/support plates extending outwardly from each end of the middle portion. Each end plate is welded to the middle section of the saddle body and contains apertures for receiving U-bolts or another securing mechanism for rigidly securing each plate to the towing or lead truck.

The middle portion or cross member of the saddle body is configured to support the saddle head on its upper surface. The saddle head is pivotally mounted to the top portion of the saddle body, which permits the towed truck to rotate in a horizontal plane in order to follow the lead truck through curves and corners during transport.

Although the saddle head is permitted to rotate or move during transport of the towed vehicle to accommodate movement of the lead vehicle, significant stress is exerted on the saddle body, and in particular, the end plates. Indeed, the rigidly secured end plates are subjected to both significant rotational and in plane loadings due at least in part to the weight of the towed vehicle, the movement and rotation of the towed vehicle with respect to the towing vehicle and the vibration and stress on the vehicles during transport at high speeds.

Prior art saddle mount constructions have exhibited significant deformation, and in some cases complete failure, at the end plates or support plate portions of the saddle body. Such deformation significant shortens the useful life of the saddle mount and may render the saddle mount inoperable or unsafe for its intended use.

Further, in certain prior art saddle mount designs, the welded portions of the saddle body, including the attachment of the end plates and structural reinforcing members within the saddle body, are located in positions that are not conspicuous to the vehicle operator or maintenance worker. As such, prior art saddle constructions are difficult to monitor or inspect for weld and structural integrity. Thus, it is difficult or impossible to detect damage to the saddle body or degradation of the welds thereon before noticeable, unrepairable damage occurs to the saddle body or to the saddle mount assembly.

In addition, such prior art saddle mount designs, the end plates are welded directly to the mid section of the saddle mount, limiting the surface area available for welding the joints together and/or limiting the ability to provide redundant or additional welded joints—thereby limiting the ability to protect against a catastrophic failure. In addition, direct, rigid connection of each end plate to the middle section of the saddle body may contribute to saddle mount failure, since such rigid and direct attachment does not provide sufficient flex or deflection between components to absorb or dissipate at least a portion of the load on the end plates.

SUMMARY OF THE INVENTION

In light of the foregoing, there is a demonstrated need for an improved saddle construction exhibiting increased durability and useful life, thereby overcoming the various problems associated with prior art saddle mount designs.

Accordingly, embodiments of the invention provide an improved saddle mount assembly capable of increased load capacity capable of handling increased forces and stress during vehicle transport. The improved saddle mount embodiments are lighter and therefore easier to install, remove and transport over conventional saddle mount configurations.

The low profile saddle mount preferred embodiments facilitate inspection of the mount's structural and weld integrity. This ensures safety of the assembly over the useful life of the saddle mount, in accordance with applicable federal, state and industry regulations. The underslung saddle mount is preferably designed and configured to simplify repair or replacement of the saddle body and the saddle head components.

The low profile saddle mount also preferably has improved strength. The low profile saddle mount is also configured so that the saddle body does not interfere with mechanical components of the towing truck.

Other features, benefits and advantages of embodiments of the present invention will be apparent from the summary and subsequent description of one or more preferred embodiments, and will be readily apparent to those skilled in the art and having knowledge of saddle devices, saddle components and the transportation of wheeled vehicles. Such features, benefits and advantages will be apparent from the above as taken in conjunction with the accompanying examples, figures and all reasonable inferences to be drawn therefrom.

One embodiment includes a saddle body configuration provided with sufficient dampening and load dissipation functions. Generally, the saddle includes a pair of laterally spaced support plates, a filler plate or load absorbing member coupled to each of the support plates, a cross member coupled to each of the support plates and the filler plates, and a saddle head. This embodiment specifically includes a saddle mount assembly for connecting a first wheeled vehicle to a second wheeled vehicle. The saddle mount assembly includes: a substantially tubular cross member having first and second open ends and an upper surface; a first support plate assembly including an upper surface, a lower surface, a first end configured to mount to a frame of a towing vehicle and a second end including at least one filler member coupled to one of the upper surface and the lower surface of the first support plate assembly, the second end of the first support plate assembly secured within the first end of the cross member; a second support plate assembly including an upper surface, a lower surface, a first end configured to mount to the frame of the towing vehicle and a second end including at least one filler member coupled to one of the upper surface and the lower surface of the second support plate assembly, the second end of the second support plate assembly secured within the second end of the cross member; and a saddle head assembly rotatably mounted atop the cross member.

Another embodiment is an improved saddle body configuration. The saddle body can be used in combination with a saddle head for connecting one wheeled vehicle to another. The saddle body can include a cross member having first and second open ends and an upper surface defining a platform and a pair of laterally spaced support plate plates. Each support plate includes a first end configured to mount to a frame of a vehicle and a second end including at least one filler or force dampening portion, wherein the second end of one of the support plates is secured inside the first open of the cross member and the second end of the other support plates is secured inside the second open end of the cross member.

Another embodiment is saddle for use in the transportation of vehicles. The saddle includes: a tubular cross member including opposing first and second open ends, an upper surface and a lower surface; a first support plate assembly including a support plate coupled to a first filler plate at a first end portion thereof, the first end portion positioned inside the first open end of the cross member, wherein the first filler plate is secured to one of the upper surface and the lower surface of the cross member; a second support plate assembly including a support plate coupled to a second filler plate at a first end portion thereof, the first end portion positioned inside the second open end of the cross member, wherein the second filler plate is secured to one of the upper surface and the lower surface of the cross member; and a saddle head assembly rotatably mounted atop the cross member.

Another embodiment is a low profile saddle mount assembly for connecting one wheeled vehicle to another. The assembly includes: (1) a tubular cross member having an upper surface, a lower surface and opposing first and second open ends; (2) a first support plate having a top surface and a bottom surface and including a first end configured to fit inside the first open end of the tubular cross member and a second end configured to engage a frame of the towing vehicle; (3) a first plate secured to one of the top surface and the bottom surface of the first support plate, the first plate having at least a portion disposed inside the first open end of the tubular cross member and secured to one of the upper and lower surfaces of the tubular cross member; (4) a second support plate having a top surface and a bottom surface and including a first end configured to fit inside the second open end of the tubular cross member and a second end configured to engage the frame of the towing vehicle; (5) a second plate secured to one of the top surface and the bottom surface of the second support plate, the second plate having at least a portion disposed inside the second open end of the tubular cross member and secured to one of the upper and lower surfaces of the tubular cross member; and (6) a saddle head assembly rotatably mounted on the upper surface of the tubular cross member.

Another preferred embodiment is a method of constructing a saddle mount for connecting a towing vehicle to a towed vehicle. The method includes: (1) providing first and second support plate assemblies, each assembly having a top surface and a bottom surface, a first end configured to mount to a frame of a vehicle and a second end including at least one plate coupled to one of the upper surface and the lower surface of the support plate assembly; (2) providing a tubular cross member having a substantially rectangular cross section and laterally disposed open ends; (3) securing the second end of the first support plate assembly inside a first open end of a substantially tubular cross member and securing the second end of the second support plate assembly inside a second open end of the tubular cross member; and (4), rotatably securing a saddle head assembly to a top surface of the substantially tubular cross member.

The saddle mount assembly embodiments are preferably of construction which is both durable and long lasting, and they should require little or no maintenance from the user throughout their operating lives. In order to enhance the market appeal of the improved saddle mount assembly, it should also be of inexpensive construction to thereby appeal to the broadest possible market.

DESCRIPTION OF THE DRAWINGS

These and other advantages of embodiments of the present invention are best understood with reference to the drawings, in which:

FIG. 1 is an isometric view of a preferred embodiment of a saddle mount of the present invention;

FIG. 2 is a top view of the preferred embodiment of the saddle mount of the present invention;

FIG. 3 is a side view of the saddle mount illustrated in FIGS. 1 and 2;

FIG. 4 is a bottom view of the saddle mount illustrated in FIGS. 1 through 3;

FIG. 5 is a bottom view of a filler plate for use in the saddle mount construction embodiment;

FIG. 6 is an exploded side view of the saddle body of the preferred saddle mount shown in FIGS. 1 through 4, illustrating assembly of the support plates and the saddle frame;

FIG. 7 is a perspective view of a support plate and a filler plate for use in the saddle mount embodiments, illustrating assembly of the support plate to the filler plate;

FIG. 8 is an exploded bottom view of the saddle mount shown in FIGS. 1 through 4, illustrating assembly of the support plates and the saddle frame;

FIG. 9 is a side view of the saddle body, illustrating assembly of the saddle frame and the support plates;

FIG. 10 is a cross-sectional view of the assembled saddle body illustrated in FIG. 9, taken along the line 10-10;

FIG. 11 is a cross-sectional view of the assembled saddle body illustrated in FIG. 9, taken along the line 11-11.

DETAILED DESCRIPTION OF THE PRESENTLY PREFERRED EMBODIMENTS

Figure 12:
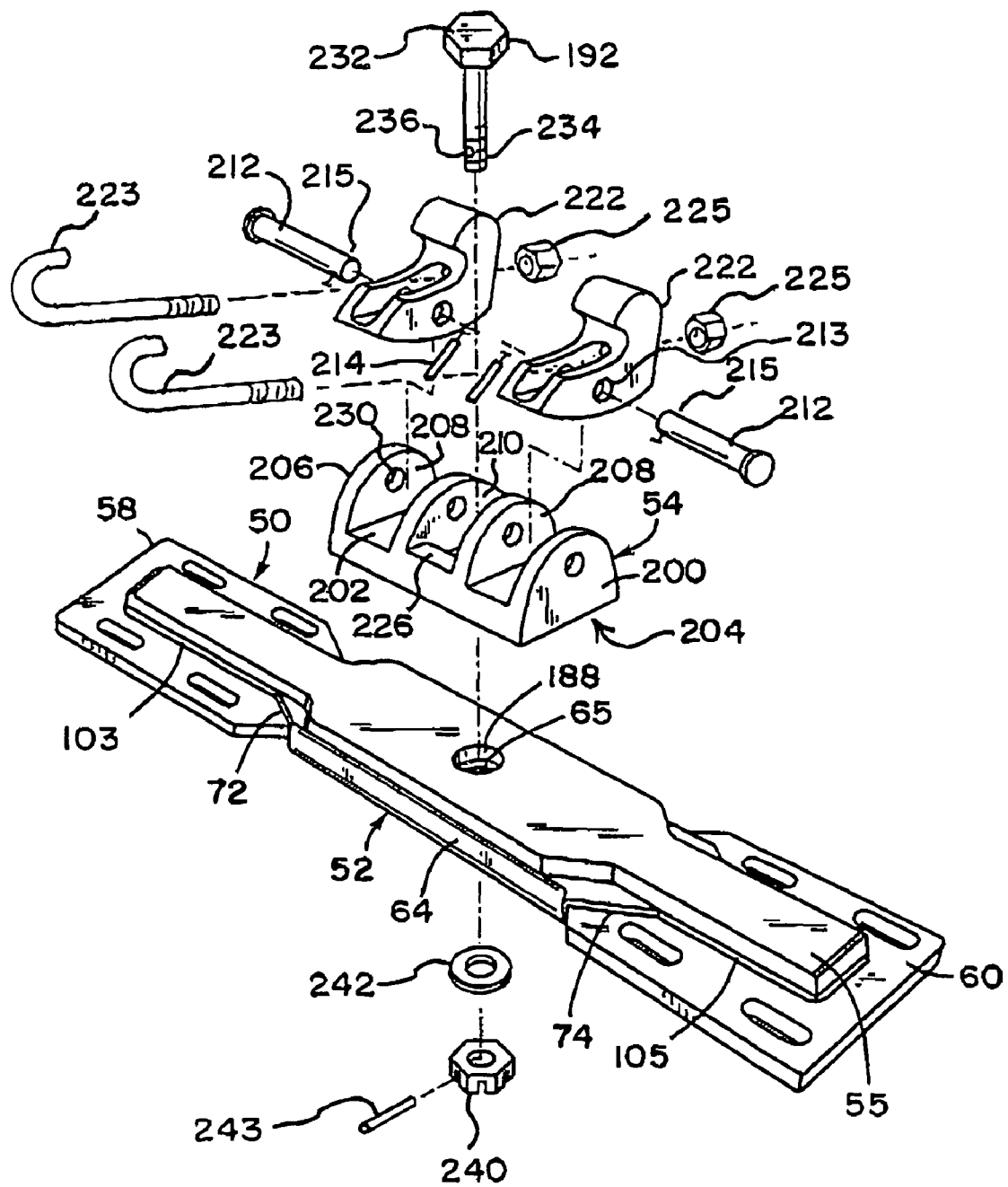
FIG. 12 is an exploded view of a preferred embodiment of the saddle illustrating assembly of the saddle head to the saddle body.

The saddle 50 embodiment includes, in its simplest form, a saddle body, indicated generally at 52 and a saddle head, indicated generally at 54, as best shown in FIG. 1. It will be appreciated that the saddle mount is preferably coupled directly to a truck frame, as described in more detail below, using J-claws, J-bolts, and fasteners. In addition, as would be well known to those skilled in the art, other saddle heads, mounts, assemblies and related towing devices can be used with equal effect and in conjunction with this improved saddle body configuration.

Referring to FIGS. 2 and 3, in addition to FIG. 1, the saddle body 52 generally includes a top surface plate 55, a saddle frame assembly 56, a bottom surface plate 57 and support plates 58 and 60. As illustrated in FIGS. 2 and 3, the saddle body 52 is substantially symmetrical about an axis C at approximately the midpoint thereof, in order to properly distribute the weight of the towed vehicle to the support plates, as will be discussed in more detail below. Accordingly, the saddle body 52 is divided into two substantially mirror image portions, indicated generally at 30 and 40, as illustrated in FIG. 2.

The saddle frame assembly 56 includes a horizontal cross member 62, constructed of tubing with a substantially rectangular cross section, having an upper surface 64, a lower surface 66, lateral side surfaces 68 and 70, a first open, tapered end 72 and a second open, tapered end 74. As best illustrated in FIGS. 2 and 3, each of the tapered ends 72 and 74 include an angled portion 76 and 78, respectively, and a straight portion 80 and 82, respectively. It will be readily apparent to those skilled in the art that the horizontal cross member may be of any geometric cross-section. Consistent with the broader aspects of embodiments of the present invention, the cross member 62 may be a solid member or alternatively include more than one horizontal cross member secured together in a manner well known to those skilled in the art.

Coaxially aligned apertures 84 and 86 are provided in the upper and lower surfaces 64 and 66 of the cross member 62, respectively, and are substantially centered in the cross member 62. A guide tube 65 extends from the aperture 84 to the aperture 86 and is secured therein to permit a bolt or another elongated member to be passed through the aperture 84, the guide tube 65 and the aperture 86 for pivotally securing the saddle head 54 to the saddle body 52, as will be described in more detail below.

The cross member 62 further includes two pairs of coaxially aligned apertures, apertures 88 and 90, and apertures 92 and 94, respectively, for securing the components of the saddle body 52 together. Additional apertures, bores or holes may be provided in the cross member 62 for securing the components of the saddle body 52 together, as will be well known to those skilled in the art.

The saddle frame assembly 56 further includes filler plates/force absorbing members 81 and 83, of substantially identical configuration. Each of the filler plates 81 and 83 includes a top surface 85 and 87 and a bottom surface 89 and 91. As best illustrated in FIG. 5, each of the lower filler plates 81 and 83 includes a tapered end portion 93 and 95, respectively, of substantially the same shape as the tapered ends 72 and 74 of the cross member 62.

As illustrated in FIG. 5, in addition to FIGS. 2 and 4, each of the lower filler plates 81 and 83 also includes a tabbed end 96 and 97. The tabbed end 96 includes a bore 99 formed in the bottom surface 89 thereof for securing the components of the saddle body 52 together. Likewise, the tabbed end 97 includes a bore 101 formed in the bottom surface 91 thereof for securing the components of the saddle body 52 together.

The saddle frame assembly 56 also includes rectangular plates 103 and 105 for securing the support plates 58 and 60, respectively, to the saddle frame assembly 56, as will be described in more detail with respect to FIG. 4 below.

Referring again to FIGS. 2 and 3, the support plates 58 and 60 are substantially identical in configuration, each having a top surface 98 and 100, respectively, a bottom surface 102 and 104, respectively, and opposing side edges 106 and 108, and 110 and 112, respectively. Each of the support plates 58, 60 further includes, respectively, a rectangular end portion 114, 116, a tabbed dampening end portion 118, 120, and a notched portion 122, 124, located therebetween.

The rectangular end portion 114 of the support plate 58 contains a set of apertures 126 adapted to receive U-bolts or another fastening mechanism for securing the saddle body 52 to the frame, longitudinal bars and/or channels of the lead or towing truck. Likewise, rectangular end portion 116 of the support plate 60 contains a set of apertures 128 adapted to receive U-bolts or another fastening mechanism. As will be appreciated by those skilled in the art, the sets of apertures 126, 128 may contain any number, shape and/or size of apertures, depending on the type of fastening mechanism utilized, the towing truck frame design and/or the applicable governmental or industry-required safety standards.

The notched portion 122 of the support plate 58 contains a first slot or cavity 130 located near the side edge 106 and a second or cavity 132 located near the side edge 110. The slots 130, 132 are configured to interfit and/or engage the tapered end 72 of the cross member 62, as will be described in more detail below. Likewise, the notched portion 124 of the support plate 60 contains a first slot or cavity 134 located near the side edge 108 and a second or cavity 136 located near the side edge 112. The slots 134, 136 are configured to interfit and/or engage the tapered end 74 of the cross member 62.

The tabbed end portion 118 of the support plate 58 is dimensioned to fit inside the cross member 62 at the tapered end 72 thereof and includes a bore 138 formed in the top surface 98 for securing the components of the saddle body 52 together. Likewise, tabbed end portion 120 of the support plate 60 is dimensioned to fit inside the cross member 62 at the tapered end 74 thereof and includes a bore 140 formed in the top surface 100 for securing the components of the saddle body 52 together.

Referring now to FIGS. 6 through 8, in addition to FIGS. 1 through 5, assembly of the saddle body 52 is described. It will be appreciated by those skilled in the art that, unless otherwise noted, saddle components are preferably constructed of steel and are assembled using any appropriate welding technique known to those skilled in the art. However, the saddle may be assembled using any method known to those skilled in the art including, but not limited to, brazing and/or mechanical fastening mechanisms, such as pins, bolts, nuts, staples, clamps, etc, or as required by applicable governmental standards or industry regulations, or both.

To assemble the portion 30 of the saddle body 52, the support plate 58 is secured to the top surface 85 of the filler plate 81 such that the bottom surface 102 of the tabbed end 118 of the support plate 58 overlies the tabbed end 96 of the filler plate 81, as shown in FIG. 7. The support plate 58 and the filler plate 81 are arranged such that the bore 99 on the bottom surface 89 of filler plate 81 is coaxially aligned with the bore 138 in the top surface 98 of the support plate 58. Preferably, as illustrated in FIGS. 8 and 11 the tabbed end 118 of the support plate 58 is larger in size than the tabbed end 96 of the filler plate 81, providing sufficient cross-sectional area for a weld joint. However, the tabbed ends 118 and 96 may be of any size required by the given end-use application or fastening mechanism, or both, as is well known to those skilled in the art.

The support plate 58 is further secured to the filler plate 81 by welding or otherwise permanently coupling the bottom surface 102 of the support plate 58 to an end portion 150 of the filler plate 81 (best shown in FIG. 9). The support plate 58 can be secured to the filler plate 81 by joining the two components together along any edge, surface and/or joint provided thereby, as will be appreciated by those skilled in the art.

As best illustrated in FIG. 8, after the support plate 58 and the filler plate 81 are assembled, a section of the tapered end 93 of filler plate 81 overlies slots 130 and 132 in support plate 58, reducing the size of slots 130 and 132 to properly interfit and/or engage the tapered end 72 of the cross member 62, as described in more detail below.

Turning again to FIG. 6, in addition to FIGS. 8 through 11, support plate 58 in combination with filler plate 81 are positioned or sandwiched inside the open tapered end 72 of the cross member 62 in such a manner that the aperture 88 in the upper surface 64 of the cross member 62 and the bore 138 in the top surface 98 of the support plate 58 are coaxially aligned. A plug, pin or bolt (not shown) may be inserted therein for retaining the support plate 58 in place relative to the cross member 62. Alternatively, the support plate 58 may be welded to the cross member 62.

Likewise, the bore 99 in the bottom surface 89 of filler plate 81 and the aperture 90 lower surface 66 of the cross member 62 are coaxially aligned and a plug, pin or bolt (not shown) is inserted therein for retaining the filler plate 81 in place relative to the cross member 62. Alternatively, filler plate 81 may be welded to the cross member 62.

Positioned in this manner, the notched portion 122 of the support plate 58 engages the tapered end 72 of the cross member 62 such that the side surface 68 of the cross member 62 interfits/mates with the slot 130 and the side surface 70 of the cross member 62 interfits/mates with the slot 132.

As best illustrated in FIG. 4, the tapered end 93 of the filler plate 81 overlies the tapered end 72 of the cross member 62. Because the tapered end 93 of the filler plate 81 is smaller in size than the tapered end 72 of the cross member 62, sufficient cross-sectional welding area is provided along the lower perimeter of the tapered end 72 of the cross member 62. However, the tapered ends 93 and 72 may be of any size required by the given end-use application of the saddle mount and/or the fastening or securing mechanism utilized, as will be well known to those skilled in the art.

As best illustrated in FIG. 6, the plate 103 is provided on the upper surface 98 of the support plate 58 and is positioned to abut the straight portion 80 of the tapered end 72 of the cross member 62. The plate 103, however, is preferably not secured to the cross member 62.

The portion 40 of the saddle body 52 is assembled in a manner similar to that of portion 30. Accordingly, the support plate 60 is secured to the top surface 87 of the filler plate 83 such that the bottom surface 104 of the tabbed end 120 of the support plate 60 overlies the tabbed end 97 of the filler plate 83. The support plate 60 and the filler plate 83 are arranged such that the bore 101 on the bottom surface 91 of filler plate 83 is coaxially aligned with the bore 140 in the top surface 100 of the support plate 60. Preferably, the tabbed end 120 of the support plate 60 is larger in size than the tabbed end 97 of the filler plate 83, providing sufficient cross-sectional area for a weld joint, as illustrated in FIG. 4. However, the tabbed ends 120 and 97 may be of any size required by the given end-use application or fastening mechanism, or both, as is well known to those skilled in the art As best illustrated in FIG. 9, the support plate 60 is further secured to the filler plate 83 by welding or otherwise permanently coupling the bottom surface 104 to an end portion 152 of the filler plate 83. The support plate 60 can be secured to the filler plate 83 by joining the two components together along any edge, surface and/or joint provided thereby, as will be appreciated by those skilled in the art.

After the support plate 60 and the filler plate 83 are assembled, a section of the tapered end 95 of the filler plate 83 overlies the slots 134 and 136 in the support plate 60, reducing the size of slots 134 and 136 to properly interfit or engage the tapered end 74 of the cross member 62.

Turning again to FIG. 6, in addition to FIG. 9, the support plate 60 in combination with the filler plate 83 are positioned inside the open tapered end 74 of the cross member 62 in such a manner that the aperture 90 in the upper surface 64 of the cross member 62 and the bore 140 in the top surface 100 of the support plate 60 are coaxially aligned and a plug, pin or bolt (not shown) is inserted therein for retaining the support plate 60 in place relative to the cross member 62. Alternatively, the support plate 60 may be welded to the cross member 62.

Likewise, the bore 101 in the bottom surface 91 of filler plate 83 and the aperture 94 in the lower surface 66 of the cross member 62 are coaxially aligned and a plug, pin or bolt (not shown) is inserted therein for retaining filler plate 83 in place relative to cross member 62. Alternatively, filler plate 83 may be welded to the cross member 62.

Positioned in this manner, the notched portion 124 of the support plate 60 engages the tapered end 74 of the cross member 62 such that the side surface 68 of the cross member 62 interfits or mates with the slot 134 and the side surface 70 of the cross member 62 interfits or mates with the slot 136.

As best illustrated in FIGS. 2 and 4, the tapered end 95 of the filler plate 83 overlies the tapered end 74 of the cross member 62. Because the tapered end 95 of the filler plate 83 is smaller in size than the tapered end 74 of the cross member 62, sufficient cross-sectional welding area is provided along the lower perimeter of the tapered end 74 of the cross member 62. However, the tapered ends 95 and 74 may be of any size required by the given end-use application of the saddle mount or the fastening or securing mechanism utilized, or both, as is well known to those skilled in the art.

The plate 105 is provided on the upper surface 100 of the support plate 60 and is positioned to abut the straight portion 82 of the tapered end 74 of the cross member 62. The plate 105, however, is preferably not secured to the cross member 62.

Top surface plate 55 of the saddle body 52 overlies the plate 103, the upper surface 64 of the cross member 62 and the plate 105 and includes a platform 185, substantially centered on the plate 55, and opposing ends 184 and 186. The end 184 of the top surface plate 55 is welded or otherwise secured to both the plate 103 and the support plate 58. Likewise, the end 186 is welded or otherwise secured to the plate 105 and the support plate 60. A recess 188, provided on the platform 185, is coaxially aligned with the apertures 86 and 84 of the cross member 62, and is dimensioned to receive a saddle head boss, as will be described in more detail below. As will be appreciated by those skilled in the art, the top surface plate 55 may optionally be provided with a security bolt hole if the saddle 50 is to be used in fifth wheel applications.

As illustrated in FIGS. 9 and 11, the bottom surface plate 57 is welded or otherwise secured to the lower surface 66 of the cross member 62. An aperture 190, substantially centered on the bottom surface plate 57 and coaxially aligned with the apertures 86 and 84 of the cross member 62, is dimensioned to receive a pivot member 192, such as a bolt or elongated pin.

Referring next to FIGS. 3 and 12, in addition to FIG. 1, the saddle head 54 is preferably a self-lubricating saddle head of the type described in U.S. Pat. No. 6,109,642, to Schuettenberg, hereby incorporated by reference in its entirety. Accordingly, saddle head 54 generally includes a base 200 including an upper surface 202, a lower lubricating surface 204, and four ears 206. The ears 206 are substantially parallel to each other and extend in a direction substantially perpendicular to the upper surface 202. A substantially centered bore (not visible), dimensioned to receive the pivot member 192, extends from the upper surface 202 and the lower surface 204. The bore is encircled by a generally cylindrical saddle head boss (also not visible) which is dimensioned to be received in the recess 188 in the top surface of plate 55. One or more grease fittings 189 may be provided in order to replenish a store of grease or lubricant, also in recess 188.

The ears 206 partition the saddle head 54 into three sections. Ears 202 define three sections, two sections 208 for installing a J-claw 222, and a third, middle section 210 including the bore and a pair of mounting blocks 226 (only one of which is visible). Each of the ears includes an aperture 230 dimensioned to receive a rocker pin 212. The rocker pins each have an aperture for receiving a retainer pin 214. Two J-bolts 223 then secure the front axle (not shown) to the J-claws 222 using nuts 225.

Referring again to FIG. 12, in addition to FIGS. 1 through 11, to assemble the saddle 50, the pivot member 192 is threaded sequentially through the aperture 190 in the bottom surface plate 57, the aperture 86, guide tube 65 and aperture 84 in the cross member 62, and the bore in the base 200.

The pivot member 192 includes an upper end 232, and a threaded lower end 234 having an aperture 236 tapped therein. When installed, the upper end 232 extends into the bore of base 200, the length of the pivot member extends into the saddle head 54, and the lower end 236 extends through bottom surface plate 57 on the bottom of the saddle body 52. To hold the pivot member 192 in place, a castle nut 240 and washer 242 are threaded into the lower end 234 of the pivot member 192 and a cotter pin 243 is inserted into the aperture 236 to lock the nut 240 and pivot member 192 in place. See also FIG. 3. Alternatively, if required by the given end-use application, a fifth wheel pin can be threaded on to the lower end 234 of the pivot member 192.

Although the saddle head 54 is preferably a self-lubricating saddle head, it will at once be appreciated by those skilled in the art that any type of saddle head assembly can be coupled to saddle body 52. For example, a saddle head of the type described in U.S. Pat. No. 4,949,985, to Lichter, hereby incorporated by reference in its entirety, may also be used in conjunction with the improved saddle 50.

To couple the saddle to a towed truck, the first J-claw 222 is assembled on one side of the saddle head 54, and a second J-claw 222 is assembled on the opposite side of the saddle head 54. Each J-claw 222 includes an aperture 213 for receiving a rocker pin 212. Initially, one J-claw 222 is inserted between ears 206 such that apertures extending through the ears and the J-claw are aligned. The rocker pin 212 is then inserted through the apertures 213, 230, until the innermost end, which is preferably flat as in the shape of a half moon, rests on the rocker pin mounting block 226. The other J-claw 222 is inserted in a like manner from the opposite side.

As illustrated in FIGS. 1 and 6, the saddle mount 50 is configured such that the bottom surface of each of the support plates can rest on the frame of the towing vehicle. The support plates 58 and 60 are preferably mounted to the vehicle by coupling U bolts through the apertures 126 and 128 of the support plates 58 and 60, respectively, with the truck frame. As illustrated, when installed onto a towing vehicle, the saddle body configuration, including the filler plates 81 and 83, the lower surface 66 of the cross member 62, and the bottom surface plate 57 are configured to provide minimum interference with a truck's hydraulic braking system or additional components of the truck beneath the truck frame.

Preferably the J-claws are coupled to the front axle of a towed truck, thereby lifting the front wheels of the towed truck off of the ground, and causing the towed truck to roll on the back wheels only. In alternate embodiments, the saddle 50 can be configured to receive a beam and related support apparatus, as shown in FIGS. 1, 3, 9, 12 and 14 of U.S. Pat. No. 5,722,677, hereby incorporated by reference in its entirety. In such embodiments, one saddle 50 is coupled to the frame of the leading truck and a second saddle mount 50 is coupled to the frame of the towed truck. The towed truck is reversed, such that the frames of the two trucks are adjacent. The rear wheels of the towed truck are lifted above the ground, and the truck rolls on the front wheels only.

It will be appreciated by those skilled in the art that it may be advantageous to utilize the saddle 50 in fifth wheel applications, depending on specific applications of the saddle 50. In such circumstances a security bolt can be inserted through the security bolt aperture in the top surface plate, if provided, and the security bolt aperture 216 in the saddle head base 200, to prevent the saddle head 54 from rotating on the top surface plate 55. In this application, horizontal rotation is provided by the rotation of the fifth wheel pin in the fifth wheel socket on the truck. In applications in which the saddle is mounted directly to the truck frame, however, the saddle head 54 rotates on the surface plate 55 to provide horizontal movement. In this case, the security bolt 260 is removed from the security bolt apertures. In both applications, the J-claws 222 and 224 pivot about the rocker pin 250 to provide motion in the up-down plane.

It may therefore be appreciated from the above detailed description of the preferred embodiment of the saddle mount 50 provides a saddle body configuration of lighter weight and enhanced durability over conventional saddle mounts. In particular, contrary to prior art saddles, the use of lower filler plates 81 and 83 and upper plates 103 and 105 can provide, at least in part, members within the saddle configuration that assist in absorbing force and vibrations, distributing the load, and dissipating the load applied to the support plates during service conditions. Indeed, the load applied to the saddle head and the cross member by the towed vehicle is no longer transferred directly and only to the support plates; rather, the plates 81, 83, 103 and 105 allow the saddle to flex and bend, and thus assisting to absorb and dissipate the forces applied to the support plates. Accordingly, the improved saddle mount described herein has a larger load capacity than conventional designs.

Further, the use of plates 81, 83 and 103, 105 in conjunction with the improved design of the support plates 58, 60 and cross member 62 provides additional support for securing the saddle mount together—providing an increased number of redundant or additional weld joints, thereby ensuring against a catastrophic failure. In addition, it can be seen that the saddle body 52 is constructed in a manner that facilitates inspection and repair of the welded joints, if required.

Additionally, the assembly of the support plates 58 and 60 and the plates 81 and 83 within the tubular cross member 62 of the saddle frame provide, at least in part, a reinforcing function without requiring additional support members inside the cross member 62. As such, saddle mount 50 can be constructed in a manner that is lighter and therefore easier to install, transport and remove, when compared to conventional saddle mounts.

Although the foregoing description has been shown and described with reference to particular embodiments and applications thereof, it has been presented for purposes of illustration and description and is not intended to be exhaustive or to limit the invention to the particular embodiments and applications disclosed. It will be apparent to those having ordinary skill in the art that a number of changes, modifications, variations, or alterations to the invention as described herein may be made, none of which depart from the spirit or scope of the present invention. The particular embodiments and applications were chosen and described to provide the best illustration of the principles of the invention and its practical application to thereby enable one of ordinary skill in the art to utilize the invention in various embodiments and with various modifications as are suited to the particular use contemplated. All such changes, modifications, variations, and alterations should therefore be seen as being within the scope of the present invention as determined by the appended claims when interpreted in accordance with the breadth to which they are fairly, legally, and equitably entitled.

What is claimed is:

1. A saddle body for use in combination with a saddle head assembly for connecting one vehicle to another, the saddle body comprising:
   a tubular cross member having first and second open ends and an upper surface;
   a pair of laterally spaced support plates, each of the support plates comprising co-planar first and second ends, said first end configured to mount to a frame of a vehicle and said second end comprising at least one dampening portion secured to a horizontally disposed surface of the cross member, wherein the second end of one of the support plates is secured inside the first open end of the cross member and the second end of the other one of the support plates is secured inside the second open end of the cross member.

2. The saddle body of claim 1 further comprising first and second filler plates, the first filler plate secured to a top surface of one of the support plates and disposed adjacent to and abutting the upper surface of the cross member and the second filler plate secured to a top surface of the other of the support plates and disposed adjacent to and abutting the upper surface of the cross member.

3. The saddle body of claim 2 further comprising a top surface plate having: a lower surface that overlies the first filler plate, an upper surface of the cross member, and the second filler plate; and an upper surface defining a platform.

4. The saddle body of claim 3 further comprising a saddle head assembly rotatably secured to the platform of the top surface plate.

5. A saddle for use in the transportation of vehicles, the saddle comprising:
   a tubular cross member including opposing first and second open ends, an upper surface and a lower surface;
   a first support plate assembly comprising a support plate having co-planar first and second end portions coupled to a first filler plate at said first end portion thereof, the first end portion positioned inside the first open end of the cross member, wherein the first filler plate is secured to one of the upper surface and the lower surface of the cross member;
   a second support plate assembly comprising a support plate having co-planar first and second end portions coupled to a second filler plate at said first end portion thereof, the first end portion positioned inside the second open end of the cross member, wherein the second filler plate is secured to one of the upper surface and the lower surface of the cross member; and
   a saddle head assembly rotatably mounted atop the cross member.

6. The saddle of claim 5, wherein the tubular cross member comprises apertures for receiving a pivot member to rotatably mount the saddle head assembly.

7. The saddle of claim 5 further comprising first and second filler plates secured between the saddle head assembly, and the tubular cross member and the first and second support plate assemblies,
   wherein the first filler plate is secured to the first support plate assembly and is disposed adjacent to and abutting the upper surface of the cross member, and the second filler plate is secured to the second support plate assembly and is disposed adjacent to and abutting the upper surface of the cross member.

8. The saddle body of claim 7 further comprising a top surface plate secured between the saddle head assembly and the cross member and the first and second filler plates,
   wherein the top surface plate has a lower surface that overlies the first filler plate, the upper surface of the cross member, and the second filler plate, and the top surface plate is secured to the first and second filler plates and the cross member; and wherein the top surface plate also has an upper surface defining a platform for rotatably mounting the saddle head assembly.

9. A low profile saddle mount assembly for coupling a towing vehicle to a towed vehicle, the saddle mount assembly comprising:
   a tubular cross member having an upper surface, a lower surface and opposing first and second open ends;
   a first support plate having a top surface and a bottom surface and including a first end configured to fit inside the first open end of the tubular cross member and a second end, co-planar to said first support plate first end, configured to engage a frame of the towing vehicle;
   a first filler plate secured to one of the top surface and the bottom surface of the first support plate, the first filler plate having at least a portion disposed inside the first open end of the tubular cross member and secured to one of the upper and lower surfaces of the tubular cross member;
   a second support plate having a top surface and a bottom surface and including a first end configured to fit inside the second open end of the tubular cross member and a second end, co-planar to said second support plate first end, configured to engage the frame of the towing vehicle;
   a second filler plate secured to one of the top surface and the bottom surface of the second support plate, the second filler plate having at least a portion disposed inside the second open end of the tubular cross member and secured to one of the upper and lower surfaces of the tubular cross member; and
   a saddle head assembly rotatably mounted atop the tubular cross member.

10. The saddle mount of claim 9 wherein a cross section of the tubular cross member is substantially rectangular.

11. The saddle mount of claim 9 wherein the cross member further comprises a top surface plate mounted to the upper surface of the cross member, the top surface plate defining a platform for rotatably mounting the saddle head assembly.

12. A saddle mount assembly for connecting a first wheeled vehicle to a second wheeled vehicle, the saddle mount assembly comprising:
   a substantially tubular cross member having first and second open ends and an upper surface;
   a first support plate assembly comprising an upper surface, a lower surface, a first end configured to mount to a frame of a towing vehicle and a second end, co-planar to said first support plate assembly first end, comprising at least one filler portion coupled to one of the upper surface and the lower surface of the first support plate assembly, the second end of the first support plate assembly secured within the first end of the cross member;

a second support plate assembly comprising an upper surface, a lower surface, a first end configured to mount to the frame of the towing vehicle and a second end, co-planar to said second support plate assembly first end, comprising at least one filler portion coupled to one of the upper surface and the lower surface of the second support plate assembly, the second end of the second support plate assembly secured within the second end of the cross member; and a saddle head assembly rotatably mounted atop the cross member.

13. The saddle mount assembly of claim 12, wherein each of the first and second support plates assemblies comprise a top filler plate disposed in the upper surface of the first end thereof, wherein one of the top filler plates is disposed adjacent to and abuts the upper surface of the cross member at one end thereof and wherein the other one of the filler plates is disposed adjacent to and abuts the upper surface of the cross member at the other end thereof.

14. The saddle mount assembly of claim 13 further comprising at least one of a top surface plate secured to the upper surface of the cross member for rotatably mounting the saddle head assembly thereon, and a bottom surface plate secured to a lower surface of the cross member.

15. A method for constructing a saddle mount for connecting one vehicle to another, the method comprising:

providing first and second support plate assemblies, each of the assemblies having a top surface, a bottom surface, a first end configured to mount to a frame of a vehicle and a second end, co-planar to said first end, comprising least one plate member coupled to one of the top surface and the bottom surface of the first and second support plate assemblies;

providing a tubular cross member having a substantially rectangular cross section and laterally disposed open ends;

securing the second end of the first support plate assembly inside the first open end of the cross member and securing the second end of the second support plate assembly inside the second open end of the cross member; and rotatably mounting a saddle head assembly to a top surface of the substantially tubular cross member.

16. The method of claim 15 further comprising:

providing first and second filler plates, the first filler plate secured to the top surface of the first support plate assembly and disposed adjacent to and abutting the upper surface of the cross member and the second filler plate secured to the top surface of the second support plate assembly and disposed adjacent to and abutting the upper surface of the cross member; and providing a top surface plate having a lower surface that overlies the first filler plate, the upper surface of the cross member, and the second filler plate, the top surface plate defining a platform for rotatably mounting the saddle head assembly.

17. The method of claim 15, wherein the first and second support plate assemblies are welded assemblies, and the step of securing is accomplished by welding the first and second support plate assemblies to the substantially tubular cross member.

* * * * *